Figure 5:
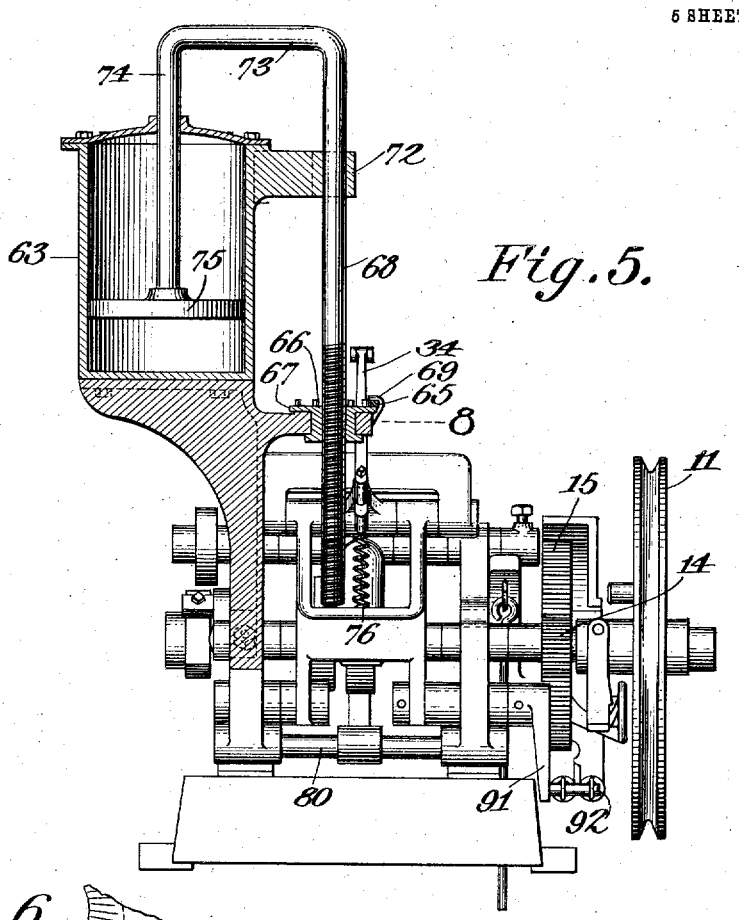

No. 12,829. REISSUED JULY 14, 1908.
F. S. JENNINGS.
CEMENT APPLYING FOLDING MACHINE.
APPLICATION FILED JUNE 10, 1908.
5 SHEETS—SHEET 1.
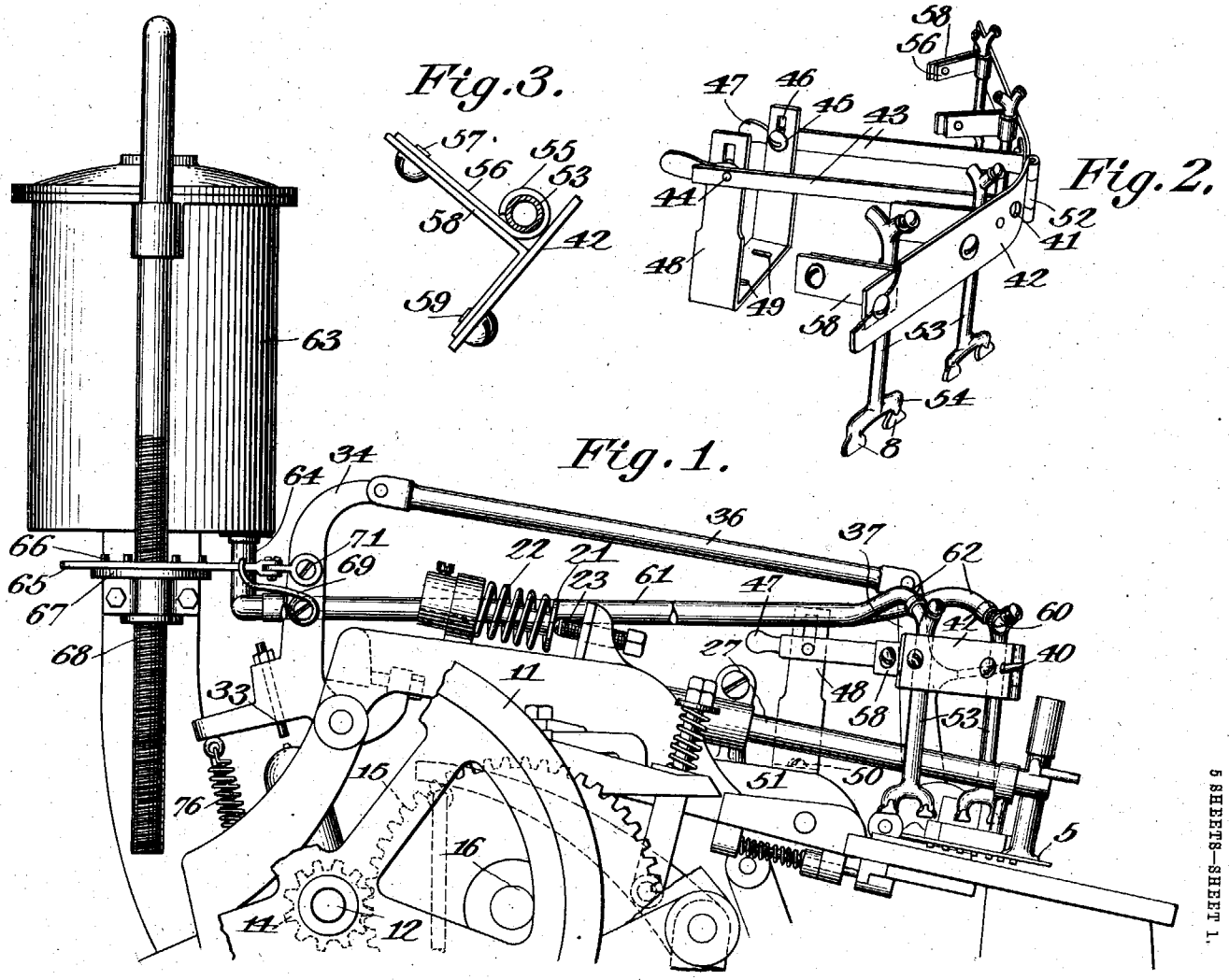
Witnesses:
Edward Maxwell
Louis Brown
Inventor:
Frank S. Jennings
by Geo. S. Maxwell, Atty.

No. 12,829. REISSUED JULY 14, 1908.
F. S. JENNINGS.
CEMENT APPLYING FOLDING MACHINE.
APPLICATION FILED JUNE 10, 1908.
5 SHEETS—SHEET 2.
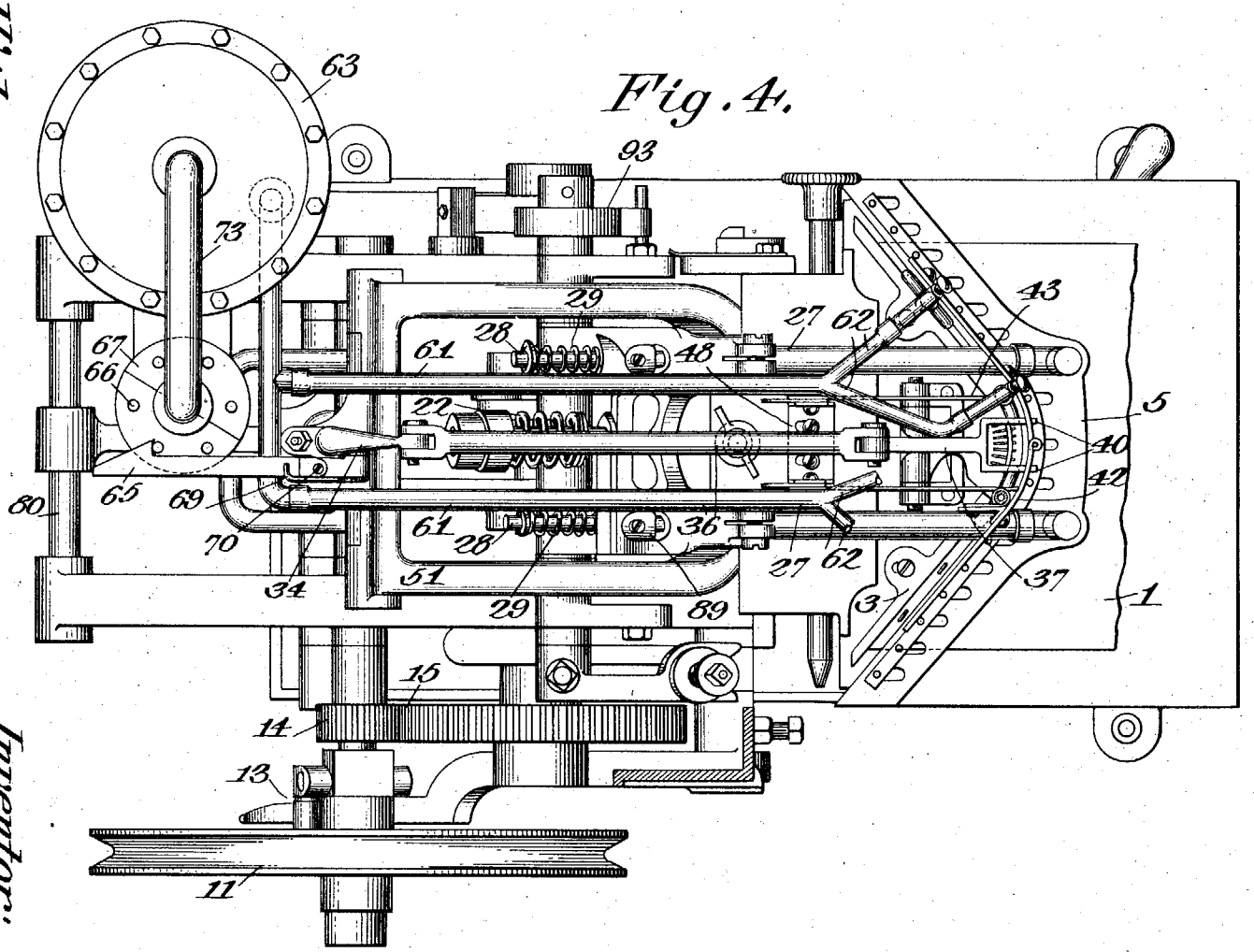
Witnesses:
Edward Maxwell.
Louis Brown
Inventor:
Frank S. Jennings,
by Geo. S. Maxwell, Atty No. 12,829. REISSUED JULY 14, 1908.

F. S. JENNINGS.

CEMENT APPLYING FOLDING MACHINE.

APPLICATION FILED JUNE 10, 1908.

5 SHEETS—SHEET 3.

Witnesses:
Edward Maxwell
Louis Brown

Inventor:
Frank S. Jennings,
by Geo. H. Maxwell, Att'y.

No. 12,829. REISSUED JULY 14, 1908.

F. S. JENNINGS.

CEMENT APPLYING FOLDING MACHINE.

APPLICATION FILED JUNE 10, 1908.

5 SHEETS—SHEET 4.

Witnesses:
Edward Maxwell
Louis Brown

Inventor:
Frank S. Jennings,
by Geo. H. Maxwell, Atty.

No. 12,829. REISSUED JULY 14, 1908.

F. S. JENNINGS.

CEMENT APPLYING FOLDING MACHINE.

APPLICATION FILED JUNE 10, 1908.

5 SHEETS—SHEET 5.

Witnesses:
Edward Maxwell.
Louis Brown

Inventor:
Frank S. Jennings,
by Geo. H. Maxwell, Atty.

UNITED STATES PATENT OFFICE.

FRANK S. JENNINGS, OF CINCINNATI, OHIO, ASSIGNOR TO BOSTON MACHINE WORKS COMPANY, OF BOSTON, MASSACHUSETTS, A CORPORATION OF MASSACHUSETTS.

CEMENT-APPLYING FOLDING-MACHINE.

No. 12,829. Specification of Reissued Letters Patent. Reissued July 14, 1908.

Original No. 888,403, dated May 19, 1908, Serial No. 333,129. Application for reissue filed June 10, 1908. Serial No. 437,761.

*To all whom it may concern:*

Be it known that I, FRANK S. JENNINGS, a citizen of United States, residing at Cincinnati, in the county of Hamilton and State of Ohio, have invented an Improvement in Cement - Applying Folding - Machines, of which the following description, in connection with the accompanying drawings, is a specification, like letters on the drawings representing like parts.

In modern shoe manufacture a large number of the leather parts composing a shoe have their edges skived and then folded over in order to present a neat appearance without undue thickness. Because of its refractory nature, leather will not remain folded unless temporarily held in some way prior to stitching. Accordingly, first the leather is passed through the skiving machine, which bevels the edge. It is then taken by operatives, who carefully apply rubber cement by hand with a brush to the skived edges. The cement is then allowed to dry and after it has thoroughly set the skived pieces are passed through a folding machine, and the folded edges are subjected to sufficient pressure to stick them together in the desired form. This procedure is not only slow, but expensive in many ways, requiring an unnecessary amount of labor, being very wasteful of expensive cement and taking up considerable of the valuable room of the factory.

My invention aims to do away with the foregoing delay, expense and inconvenience, by applying directly to the skived edge of the leather a minimum amount of cement at the critical moment, when the edge is being folded, thereby entirely eliminating the hand labor above mentioned as well as the waste of cement, and at the same time producing a much neater and more desirable result.

My invention is applicable to all varieties of folding machines.

My invention will be further explained and its main features more fully set forth in the course of the following description, reference being had to the accompanying drawings, in which I have shown one of many contemplated embodiments of my invention.

Figure 6:
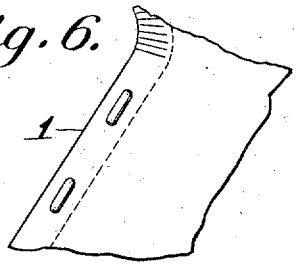
Figure 7:
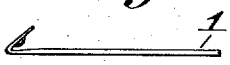
Figure 8:
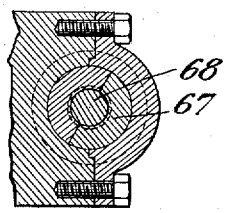
Figure 9:
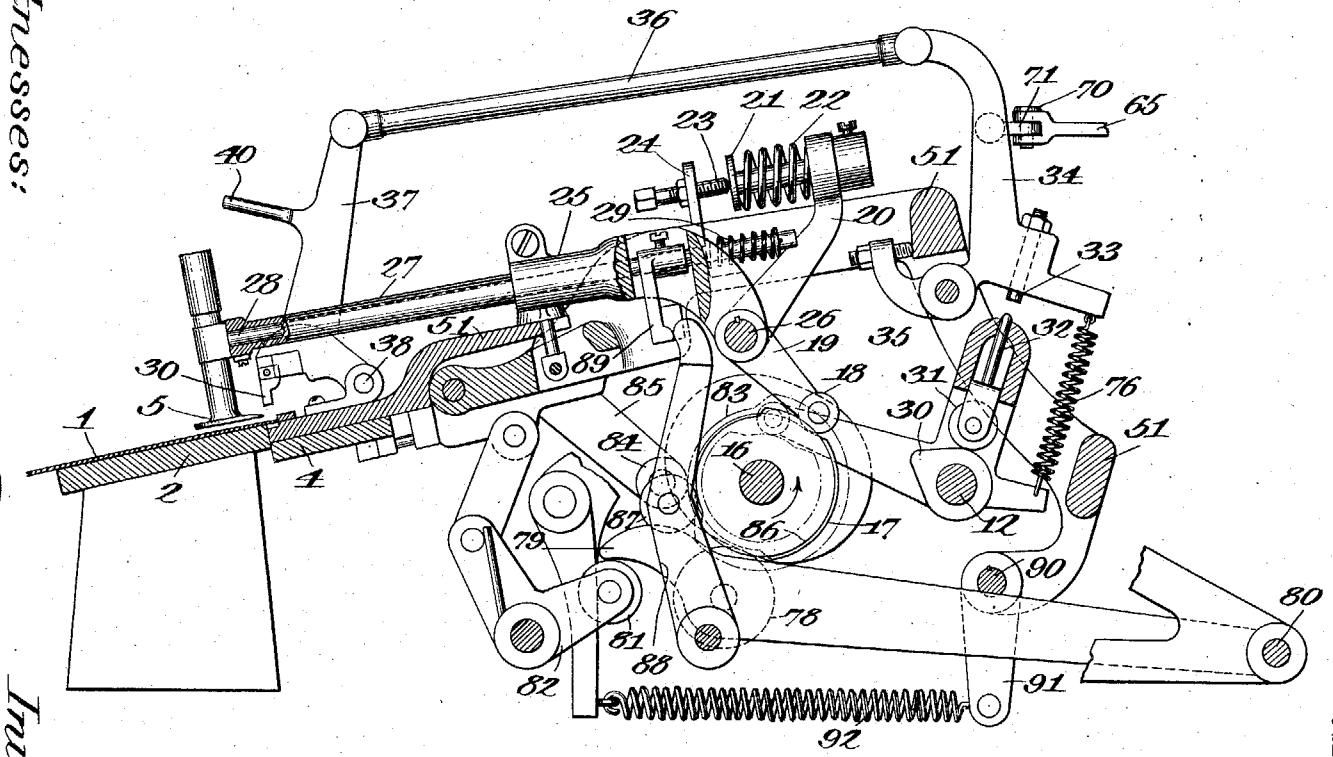

In the drawings, Figure 1 represents in side elevation a machine constructed according to my invention for folding uppers, parts being broken away and omitted for clearness of illustration; Fig. 2 is a perspective view of the cement-delivering portion of the apparatus; Fig. 3 is an enlarged sectional detail thereof to be referred to; Fig. 4 is a top plan view of the complete machine; Fig. 5 is a view thereof partly in section and largely in rear elevation; Figs. 6 and 7 are fragmentary views in top plan and edge elevation respectively of a portion of the shoe upper being folded; Fig. 8 is a fragmentary sectional detail taken in the direction of the dotted line 8—8, Fig. 5; Fig. 9 is a central vertical sectional view of the folding portions of the machine with the cement-applying parts omitted, in order to enable the general operation of the machine to be more fully understood; and Figs. 10, 11, 12, 13, 14 and 15 are sectional details showing the order of folding and cementing movements in the process of completely folding a blank.

I have herein shown my invention as applied to a Booth folding machine for folding shoe uppers. I have chosen this form of folding machine for the purpose of more fully and comprehensively illustrating my invention and showing its applicability to folding machines in general, and it will therefore be understood that my invention is not limited to any particular folding machine, and that it resides, broadly stated, in so modifying and arranging the general features of the folding machine, and combining therewith specially adapted cement-applying devices, as to accomplish automatically the cementing of the skived edge of the leather at that step or stage in the folding operation when the cement can be applied to the best advantage without delaying the folding or interfering with the neat and accurate completion of the work. The result which it is my aim to secure is a properly cemented fold, in which all the cement-applying operations are accomplished by means of automatic mechanism operating at the same time as the folding mechanism and in connection with the folding operation.

Without undertaking to describe all the minute details of the folding mechanism, it is sufficient to point out that the work 1 is supported on a suitable table or receiving bed 2 with the front skived edge of the work against a gage 3 of a folder 4 which operates to fold the edge when the leather is properly held down by a former or shaper 5.

Figure 10:
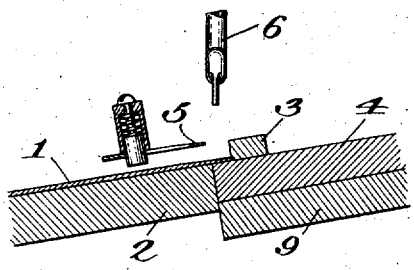
Figure 11:
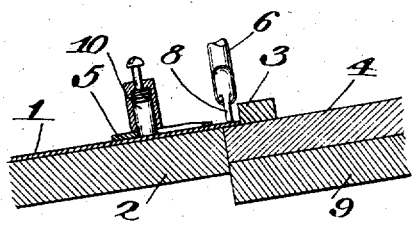
Figure 12:
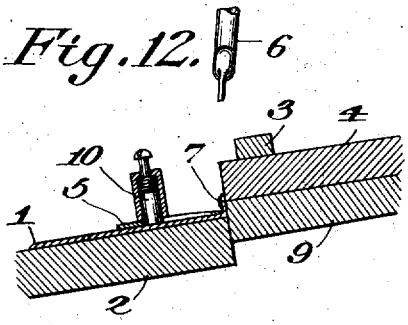

The general scheme of operation is shown graphically in Figs. 10—15. The leather 1 being put in place as shown in Fig. 10, the former 5 first begins to descend on the blank of leather and is immediately followed by the cement applier 6 of the cement delivery apparatus, shown in Fig. 2, which comes in contact with the leather as soon as the latter has been positively positioned and clamped, as shown in Fig. 11, at which time a small smear or globule of cement, as indicated at 7 Fig. 12, is deposited by the contact of the long thin mouth 8 of the cement applier 6. Thereupon the cement applier instantly retreats, as shown in Fig. 12, so as not to interfere with the folding, and then the folder 4 at once rises, as shown in Fig. 12, and then shifts forward on the alining ledge or edge of the definer 9 to the position shown in Fig. 13, thereby simultaneously wiping the entire edge over onto the body of the leather, whereupon the former slides back from beneath the partially folded edge as in Fig. 14, and as soon as the front edge of the former is out of the way of the cement, the folder 4 is brought down with heavy pressure upon the leather, thereby spreading the long narrow globules of cement over substantially the entire skived surface of the leather, holding the same in place an appreciable time for permitting the cement to set, and then retreating, etc., in usual manner, so as to permit the removal of the folded upper and return the machine to proper position for repeating the folding operation. Usual spring hold-fasts 10 are shown for preventing improper shifting of the leather.

Motion is communicated to the various parts of the machine by a belt pulley 11 or any other suitable means loose on a main driving shaft 12 and provided with clutch mechanism 13 (which need not be herein described, as it forms no part of my invention) by which the machine is properly started and stopped, which rotates a pinion 14 in mesh with a gear 15 for driving a cam shaft 16 containing a cam 17 operating a roll 18 of a lever 19 whose arm 20 carries a plunger 21 yieldingly held by a spring 22 to engage an adjustable bearing 23 in a bracket 24, projecting upwardly from the former carrier frame 25 fast on a shaft 26, which carries the crank or lever 19. Said carrier frame extends forwardly at 27 and has yieldingly mounted therein slide rods 28 normally held back by springs 29, said slide rods at their forward ends carrying the former 5. Thus at the proper moment the cam 17 lowers the former upon the folding bed 2. Just as this operation is taking place, a cam 30 on the main shaft 12 engages a roll 31 of a plunger 32, movable vertically into engagement with an adjustable stud 33 of an elbow lever 34 pivoted on a shaft 35, and raises said bell crank, throwing forward the upper end thereof, which is connected by a rod 36 to an angular arm 37 pivoted at 38 to the folder 4 and provided at its forward end with a series of vertical snipping knives 39 for snipping the leather about the curve, as shown in Fig. 6.

Figure 13:
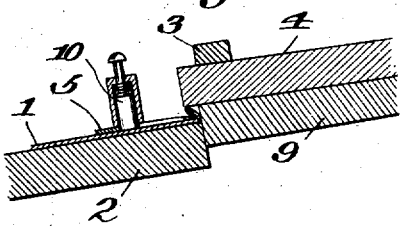
Figure 14:
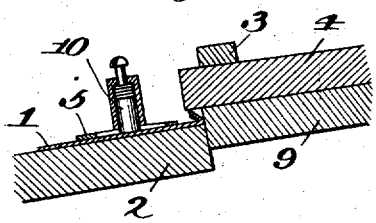
Figure 15:
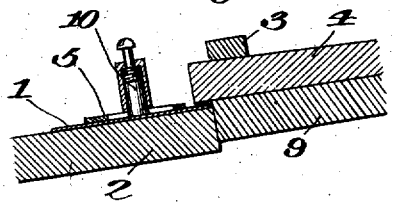

Projecting from the forward upper portion of the lever 37 is a rigid pin or stem 40, herein shown as passing loosely through a hole 41 in a supporting plate 42 of the cement deliverer, as best shown in Figs. 1 and 2. Said plate 42 is supported by braces 43 adjustably pivoted at 44 by means of pins 45 mounted in slots 46 and operated by levers or handles 47 in a U-shaped upright 48, adjustably secured by slots 49 and screws 50 at the rear of the folder 4 to the folder frame 51. The supporting plate 42 is hinged at 52 to accommodate it to different angles of curved edges to be cemented, and carries a series of tubes 53, herein shown for convenience as four in number, each tube having at its lower end a branching cement applier 54 provided with the long narrow delivery end 8 already described. The two portions of the hinged plate 42 constitute a cement applier formed in two parts, and the series of tubes 53 carried by each of said parts constitutes cement-holding chambers, while the portions 54 terminating in the mouths 8 constitute delivery portions, the same being hereinafter broadly claimed. The tubes 53 are adjustably mounted, so as to adapt them to all the variety of folds and folding operations which the machine is required to perform, being herein shown as yieldingly grasped by the curved end 55 of a finger 56 adjustably clamped at 57 to an angular bracket 58 pivotally clamped at 59 to the support 42. By this arrangement it will be seen that the cement appliers may be brought into practically any position desired simply by adjusting the parts 43, 56, 58. Each tube 53 is herein shown as provided with an adjustable valve 60 for accurately regulating the movement of cement permitted to be delivered to the applier end 8. Supply tubes 61 furnish cement, being connected to the pipes 53 at their forward ends by branches 62, see Fig. 4, and at their ends to a cement tank 63 by a pipe 64. The cement is positively controlled by the automatic action of the machine, the dog 65 being provided to engage with the pin 66 of the ratchet nut 67 on a threaded rod 68, said dog being held in yielding engagement by a spring 69 and pivoted at 70 to a stud 71 mounted on the upper end of the bell-crank 34. The rod 68 is guided by the nut 67, see Fig. 5, and by an upper bracket 72 on the cement tank 63 and at its upper end is bent over laterally at 73 and thence downwardly at 74 and provided at its end within the tank with a tight-fitting head 75. Thus at each cement-depositing movement of the apparatus the head 75 is forced downwardly to an exceedingly slight extent, just sufficient to feed positively forward the proper amount of cement and also, because of the piston-like engagement of said head 75 with the tank, the cement is positively prevented from flowing any faster than desired. The movement of the snipping knives 39 is quick, due to the cam 30 and an opposing retracting spring 76, and, as herein shown, the depositing of cement is equally rapid, so that the folding operation is not delayed thereby. By having the cement deliverer (*i. e.*, the part shown in Fig. 2) pivoted high up and operated by the comparatively long stem 40 the cement applying ends 8 are caused to swing slightly inwardly, so that they do not interfere with the movement of the snipper and the adjacent mechanism, but operate to deposit the cement neatly and accurately along the narrow skived edge or margin which is to be folded over. As soon as the snipping has taken place and the cement has been deposited, a cam 77 on the shaft 16 engages a roll 78 of a lever 79 pivoted at 80 to the frame of the machine, which causes the under surface of said lever 79 to bear downwardly upon a roll 81 of a bell-crank 82 which forms part of a toggle whose upper link is pivoted to the folder frame, see Fig. 9, thereby raising the folder 4, whereupon a cam 83 engages a roll 84 of a rigid arm 85 depending from the under side of said folder frame, thereby shifting the folder 4 forward, as shown in Fig. 13. At this moment a cam 86 engages a roll 87 of a lever 88 whose upper end is in contact with lugs 89 secured to slide rods 28, whereupon the latter, and thereby the former 5 are shifted forward to the position shown in Fig. 14, just as the cam 77 has moved the roll 81 down, so as to break its toggle over to the right, Fig. 9, thereby lowering the folder 4 into pressing engagement upon the fold of the leather piece as shown in Fig. 15.

The folder frame 51 extends rearwardly and downwardly and is mounted at its rear end on a shaft 90 provided with a rock lever 91 normally held forward under heavy tension by a spring 92 which coöperates with the further toggle movement at 82 to raise and then retract the folder 4 the moment that the cam 83 and arm 85 permit thereof. Meanwhile the cam 17 and levers 19, 20 have released the pressure on the former 5 so that when the forward pressure of the arm 88 on the slide rods 28 has been relieved, a convolute spring 93, see Fig. 4, instantly rotates the shaft 26 and restores the former to the position shown in Fig. 10. It is unnecessary for me to go into an explanation of further details of the general mechanism, which do not form an essential part of my invention. The cement delivering and applying mechanism is so mounted that it may be depressed by hand at any time, simply by pressing downwardly upon the plate or frame 42.

I have already described the operation of the machine in connection with the description of the mechanism. It may be briefly summarized: the operator places the blank to be folded in the machine in usual manner with the skived edge of the blank 1 resting in position as shown in the drawings. Thereupon the machine is started and immediately brings the former 5 down into clamping engagement with the blank, whereupon the snipping knives 39 quickly slit the extreme forward edge of the curved part, in order that a neat, perfect fold may be made, and during this movement of the snipper knives the cement appliers 8 just barely touch the leather and delicately leave a film or smear of cement just sufficient for the purpose along the narrow exposed skived edge or surface which is to be folded over by the machine. The cement appliers instantly move back with the snippers, and the folder 4 thereupon rises and turns up the cement smeared edge just as the former 5 moves back out of the way of the cemented leather which is about to be turned down, as shown clearly in Fig. 14. As soon as the former 5 is out of the way, the folder 4 comes down upon the edge firmly, as shown in Fig. 15, thereby squeezing the cement laterally in all directions so as to make a neat and perfect job. After holding the parts together for the necessary time, the folder rises and then retracts and falls into its original position, the former also recovering its original position, and the blank is removed. It will be found that the edge is not only perfectly folded, but has been perfectly cemented by the machine in the process of folding, thereby entirely eliminating the wasteful and expensive hand-cementing and delay which have heretofore been considered necessary. If for any reason the operator should observe that enough cement had not been deposited he has time to instantly depress the cement appliers into engagement with the leather again before the folder has appreciably raised the fold. He accomplishes this movement simply by pressing downwardly upon the cement-delivering frame. This movement not only moves the cement appliers down into engagement with the leather, but it operates the cement feeding mechanism at the feed tank to compel the delivery to the cement appliers of more cement. If he finds that there is a continued scarcity of cement he simply opens the valves 60 a little more than before. If the particular pattern being folded requires the cement applied near the edge he raises the arms 43 in the slots 46 or he slides the support 48 back slightly on its adjusting support 49 according to the requirements of the case. I prefer to deposit the cement as near to the line of the subsequent fold or crease as practicable, thereby usually insuring somewhat neater work.

The adjustment of the angle of the cement appliers and their distance from the leather will depend somewhat upon the character of the cement being employed, it being sufficient with some kinds of cement to bring the cement appliers merely close enough to the leather to touch the cement to the leather as it protrudes from the open ends of the appliers, whereas with other cements it is advisable to bring the appliers down forcibly upon the leather for delivering a more copious daub of cement.

It will be understood that the number of cement spouts or pipes may be increased or diminished according to the requirements of the particular machine or work to be cemented, and I wish it understood that I do not limit myself to any of the mechanical details of the present embodiment of my invention, as I consider it broadly new to combine with a folding machine means for automatically applying cement in the midst of or in connection with the folding movements at the proper place and in the restricted quantities required for making a finished job. Furthermore, I wish it understood that my invention is equally applicable to all kinds of edge-folding machines, the particular kind of folding machine herein shown being selected merely for the purpose of more fully and clearly illustrating the purpose and operation of my invention without intending to restrict myself in any way to the mechanisms or particular combination of operations peculiar to this machine, excepting as otherwise stated in certain of the claims hereinafter contained.

Having described my invention, what I claim as new and desire to secure by Letters Patent is, 1. The combination with means for supporting a piece of leather to be folded, means for positively holding the leather in place, and means for simultaneously folding over with a wiping action the entire edge of the leather while it is so held, of coöperating cement-applying mechanism arranged and operating to cement the edge which is to be folded while so held and immediately prior to said wiping action.

2. The combination with leather-edge folding mechanism, of coöperating cement-applying mechanism arranged and operating to cement the entire edge being united, including means for applying the cement along the edge of the leather throughout the length of said edge in position to be spread by subsequent pressure over both of the contacting surfaces when subsequently folded, said folding mechanism including means for thereafter bodily wiping over said entire edge directly against the body of the leather and simultaneously pressing said entire edge down flat upon the body, simultaneously spreading the cement and creasing and uniting the folded leather.

3. The combination with leather-edge folding mechanism, including means to hold the leather immovably, and means to turn up and wipe over the edge bodily directly upon the body of the leather, of means to deposit cement on said edge while so held immovably between the holding movement of said holding means and the up-turning movement of said edge-turning means.

4. The combination with leather-edge folding mechanism, including a former to hold down the leather, and wiping means to overturn and press the overturned edge directly down upon the body of the leather, of means operating prior to said pressing means and after the holding movement of said former for applying cement in position to be spread by said pressing operation over the meeting surfaces of said edge and body when overturned and pressed together as stated.

5. The combination with means for supporting a piece of leather to be folded, means for holding the leather in place, and means for folding over upon itself with a wiping action the edge of the leather so held, of coöperating snipping means arranged to snip the edge at a curved intermediate place in the length of the leather so held, and cement-applying mechanism, said cement-applying mechanism and snipping means being arranged and operating to cement and snip the edge of the leather at the same place while the leather is held stationary and immediately prior to said wiping action.

6. The combination with means for supporting a piece of leather to be folded, means for positively holding the leather in place, and means for folding over upon itself with a wiping action the entire edge of the leather so held, of coöperating snipping means arranged to snip the edge at a curved intermediate place in the length of the leather so held, and cement-applying mechanism, said cement-applying mechanism and snipping means being arranged to operate in unison upon said edge immediately prior to said wiping action and while the leather is being positively held immovably on its support.

7. The combination with leather-edge folding mechanism, including a former to hold down the leather and control and outline the shape of the fold, and wiping means to overturn and press the overturned edge directly down upon the body of the leather, of cement depositing means located to deposit the cement along the edge of the leather between the forward edge of said former and the extreme free edge of the leather, and means for operating said cement-depositing means while the leather is held immovably by said former and immediately prior to the folding movement of said wiping means.

8. The combination with leather-edge folding mechanism, for folding back over upon the body of the leather the extreme edge thereof, of automatic means for applying and restricting cement to the extreme edge which is to be folded over upon the body aforesaid, said applying means being constructed to restrict the cement to the extreme edge which is bent back in said act of folding, said folding mechanism including means to press simultaneously the entire length of the fold for spreading the cement over both contacting surfaces thereof.

9. The combination with leather-edge folding mechanism, for folding back over upon the body of the leather the extreme edge thereof, of automatic means for applying cement simultaneously in a series of daubs at all points of the entire edge of the leather which is to be united just prior to the folding operation thereof, said folding mechanism including means to press simultaneously the entire length of the fold for spreading the cement over both contacting surfaces thereof.

10. The combination with leather - edge folding mechanism, of coöperating cement-applying means arranged and operating to cement the edge being folded, and including means for applying the cement along the edge of the leather in a ridge or heap to be spread over the surface by subsequent pressure, said folding mechanism including means for subsequently pressing the folded leather simultaneously at all points of its length to spread said cement.

11. The combination with leather - edge folding mechanism, of a cement applying mechanism having a series of open-ended applying mouths, and means to bring said mouths into contact with the edge of the leather prior to the folding thereof.

12. The combination with means for receiving a piece of leather to be folded, a former to hold said leather in place, a folder to fold the edge of the leather over said former, and mechanism to operate said folder while the former is holding the leather, of a cement applier and automatic mechanism for operating said cement applier to deliver cement to the edge of the leather just as the leather is being turned up by said folder.

13. The combination of means for supporting a piece of leather to be folded, means for holding said leather in place, means for folding over the edge of said leather so held, a cement applier for applying cement along the edge to be folded, and mechanism for automatically actuating said cement applier before the edge is folded, said cement applier also having a construction permitting of its operation by hand independently of its automatic operation.

14. The combination with leather - edge folding mechanism, of automatic cement applying mechanism arranged to deposit cement simultaneously throughout the length of the entire edge which is to be folded, and adjustable controlling means for delivering to said cement applier the exact amount of cement required.

15. The combination with leather - edge folding mechanism, of a plurality of cement appliers, means for automatically operating said cement appliers intermittingly in unison with said folding mechanism, and intermittingly operated cement - controlling means for forcing to said cement appliers the definite amount of cement required for each application.

16. The combination with folding mechanism, including means for supporting a piece of leather to be folded, a former to hold the leather and control the shape of the fold, and means coöperating therewith to fold over and wipe forward the free edge of the leather onto the body of the leather, of cement applying mechanism arranged to deposit cement adjacent said edge co-extensively with the length thereof which is to be folded, means for automatically moving said cement applying mechanism into operative position intermittingly, in unison with the movement of the folding mechanism, means for controlling the flow of cement to said cement applying mechanism, and means for intermittingly actuating said controlling means to force cement forward in unison with said intermitting operation of said cement applying mechanism.

17. The combination with leather - edge folding mechanism, of automatic cement applying mechanism arranged to deposit cement on said edge while being folded, and a source of cement supply, a conduit leading therefrom to said applying mechanism, and branches from said conduit for delivering small portions of cement to different parts of said applying mechanism.

18. The combination with leather - edge folding mechanism, of automatic cement applying mechanism arranged to deposit cement at a plurality of places on said edge while being folded, and means for independently controlling the delivery of the cement to said different places.

19. The combination with cement-applying means arranged to apply cement adjacent to the edge of the stock throughout the length thereof prior to folding, of means arranged to coöperate therewith to snip a portion of the length of said edge intermediate of the length of the cemented area to permit it to be folded, and means for folding over at one operation both the snipped and not snipped portions of the edge which has been cemented.

20. The combination with cement-applying means arranged to apply cement adjacent to the edge of the stock throughout the length thereof prior to folding, of means for simultaneously snipping an intermediate portion of the length of said edge as the cement is being applied along the edge at both sides of said intermediate portion, and means for folding over the entire edge.

21. The combination with cement applying means arranged to apply cement adjacent to the edge of the stock simultaneously throughout the length thereof, of means constructed and arranged to snip at a curved intermediate place in said edge in the midst of the cement applying.

22. The combination with folding mechanism, including means for supporting a leather piece, a former to hold down the leather and control the shape of the fold, and means for wiping over the edge of the leather onto the body thereof, of cement applying means arranged to apply cement adjacent to the edge of the stock throughout the length thereof prior to folding, and means arranged to coöperate therewith to snip an intermediate portion of the length of said edge to permit it to be folded.

23. The combination with folding mechanism, including means for supporting a leather piece, a former to hold down the leather and control the shape of the fold, and means for wiping over the edge of the leather onto the body thereof, of cement applying means arranged to apply cement adjacent to the edge of the stock simultaneously throughout the length thereof, and means constructed and arranged to snip at a curved intermediate place in said edge in the midst of the cement applying.

24. A machine of the kind described, comprising a cement applier formed in two parts, having separate cement-holding chambers and delivery portions, and means for accurately adjusting said parts toward and from each other to suit different articles to be cemented.

In testimony whereof, I have signed my name to this specification, in the presence of two subscribing witnesses.

FRANK S. JENNINGS.

Witnesses:
I. Fleischer,
J. F. Kinney.